May 4, 1937.  A. O. SCHOENINGER  2,079,046

KEY RING CONSTRUCTION

Filed Aug. 23, 1935

Inventor
Adolf O. Schoeninger
By Nathaniel Frucht
Attorney

Patented May 4, 1937

2,079,046

UNITED STATES PATENT OFFICE 2,079,046

KEY RING CONSTRUCTION

Adolf O. Schoeninger, Irvington, N. J., assignor to Forstner Chain Corporation, a corporation of New Jersey Application August 23, 1935, Serial No. 37,500

8 Claims. (Cl. 70—459)

My present invention relates to key ring constructions, and has particular reference to a safety lock arrangement therefor.

The principal object of the invention is to provide an improved safety lock construction for a key ring, whereby the keys may be readily inserted or removed, but the key ring cannot be accidentally opened.

Further objects of my invention are to provide a key ring construction that is suitable for ornamentation, that is light in weight, and that is strong and sturdy.

With the above and other advantageous features in view, my invention consists of a novel arrangement of parts more fully disclosed in the detailed description following, in conjunction with the accompanying drawing, and more specifically defined in the claims appended thereto.

Figure 1:
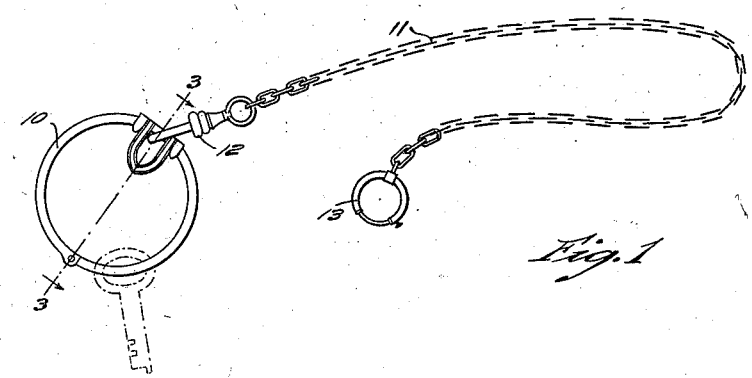
Fig. 1 is a perspective view of the novel key ring and its associated key chain.
Figure 2:
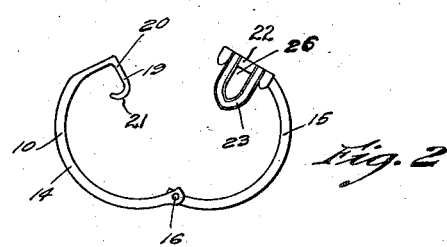
Fig. 2 is a plan view of the ring, the parts being in separated relation.
Figure 3:
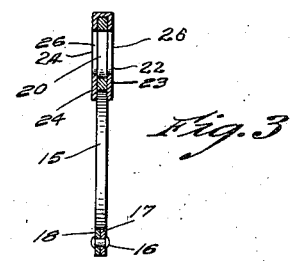
Fig. 3 is a section on the line 3—3 of Fig. 1.
Figure 4:
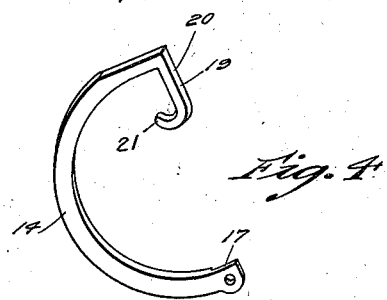
Fig. 4 is a perspective view of one portion of the ring.
Figure 5:
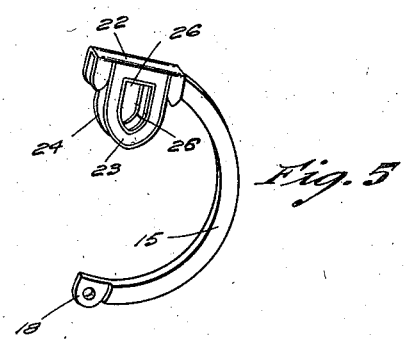
Fig. 5 is a perspective view of the other portion of the ring.

Referring to the drawing, the novel key chain includes a key ring 10 and a chain 11, the chain 11 having the usual snap hook 12 and end fastener 13. The novel ring 10 includes two portions 14, 15 hingedly connected together at their lower ends in any suitable manner, as by a hinge pin 16, these lower ends being flattened as indicated at 17 in Fig. 4 and at 18 in Fig. 5 to maintain the two portions in the same plane. The portion 14 is shaped at its free end to provide a hook end 19, with a vertical shank 20 and an upturned finger 21, and the portion 15 is provided with a housing member 22 having two spaced sections 23 and 24, which have aligned openings 26, the end of the ring portion 15 in the housing member forming an abutment 25, the hook 20 being adapted to be received within the housing member 22 as disclosed in Fig. 6, whereby the snap hook 12 may lockingly engage the upper part of the portion 14 by extending through the aligned openings 26, whereby the two parts 14 and 15 are locked against separation. When positioning keys on and removing keys from the key ring 10, the snap hook 12 is removed from the key ring, thus permitting a separation of the parts 14 and 15, whereupon the keys may be passed over the hook end 19; the hook end then being inserted in position within the housing member, the snap hook 12 is then passed through the aligned openings, whereby the key ring portions are locked against separating movement.

Figure 6:
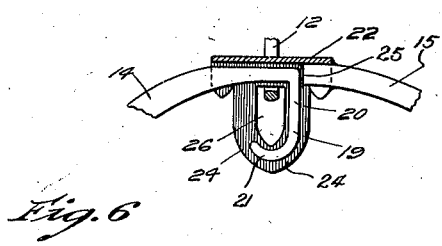
Fig. 6 is a sectional detail disclosing the arrangement of the parts when the ring is in locked position.

Any desired material may be used for the portions 14 and 15, wire being preferred, and the housing member may be ornamented in any desired manner; the hook end 19 serves to strengthen the sides of the housing member when in position therebetween, and also functions as a guide for preventing incomplete locking, as the hook end when completely concealed from view within the housing member ensures positioning of the shank 20 in proper locking position as disclosed in Fig. 6.

While I have described my invention as applied specifically to a key ring, the novel features of the disclosed construction may be utilized for jewelry items such as pendants and the like.

While I have described a specific constructional embodiment of my invention, it is obvious that changes in the material used for the parts, in their ornamental appearance, their co-action, and their details of construction, may be made to suit different requirements for designs, without departing from the spirit and the scope of the invention as defined in the appended claims.

I claim:

1. In a safety key ring, two members hingedly connected together at one end, one member having an end portion comprising spaced parts each having an opening and an abutment extending transversely across said member between said spaced parts and adjacent said opening, and the other member having an end portion terminating in an end part spaced from the body thereof and adapted to seat intermediate said spaced parts against said abutment and between said abutment and said openings.

2. In a safety key ring, two members hingedly connected together at one end, one member having an end portion comprising spaced parts each having an opening and an abutment extending transversely across said member between said spaced parts and adjacent said opening, and the other member having a depending shank portion terminating in an end part spaced from the body thereof and adapted to seat intermediate said spaced parts against said abutment and between said abutment and said openings.

3. In a safety key ring, two members hingedly connected together at one end, one member having an end portion having an opening and an abutment extending transversely across said member adjacent said opening, and the other member having a depending hook portion terminating in an end part spaced from the body thereof and adapted to seat against said abutment and between said abutment and said opening.

4. In a safety key ring, two members hingedly connected together at one end, one member having an end portion comprising spaced parts each having an opening and an abutment extending transversely across said member between said spaced parts and adjacent said opening, and the other member having a depending hook portion terminating in an end part spaced from the body thereof and adapted to seat intermediate said spaced parts against said abutment and between said abutment and said openings.

5. In a safety key ring, two members hingedly connected at one end, one member having an end portion comprising spaced parts extending inwardly towards the center of the key ring, said spaced parts each having an opening and an abutment extending transversely between the spaced parts and adjacent said opening, and the other member having an end portion also extending inwardly towards the center, and adapted to seat intermediate said spaced parts against said abutment and between said abutment and said opening.

6. In a safety key ring, two members hingedly connected together at one end, one member comprising spaced parts extending inwardly towards the center of the key ring and having an opening and an abutment extending transversely between the spaced parts and adjacent said opening, and the other member comprising a snaphook receiving hook portion and adapted to seat intermediate said spaced parts and against said abutment.

7. In combination, a key ring comprising two members, a hinge connecting the members at one end, one member including separated plates extending toward the center of the ring and an abutment between the plates, the other member including a hook-shaped member extending between the plates and engaging the abutment, and means to lock the hook-shaped member between the plates.

8. In combination, a safety key ring comprising two members hingedly connected at one end, one member having spaced parts extending inwardly towards the center of the key ring, said spaced parts carrying an abutment, the other member having a hooked end portion adapted to pass intermediate the spaced parts of the first mentioned member, and means to hold the hooked end portion between the spaced parts.

ADOLF O. SCHOENINGER.